(12) United States Patent
Azar et al.

(10) Patent No.: US 12,551,375 B2
(45) Date of Patent: Feb. 17, 2026

(54) BIOFLUID SHUNT VALVE WITH SHEATH AND MONITORING DEVICE

(71) Applicant: Verily Life Sciences LLC, South San Francisco, CA (US)

(72) Inventors: Dimitri Azar, San Francisco, CA (US); Supriyo Sinha, San Francisco, CA (US)

(73) Assignee: Verily Life Sciences LLC, Dallas, TX (US)

( * ) Notice: Subject to any disclaimer, the term of this patent is extended or adjusted under 35 U.S.C. 154(b) by 1004 days.

(21) Appl. No.: 17/610,657

(22) PCT Filed: May 12, 2020

(86) PCT No.: PCT/US2020/032478
§ 371 (c)(1),
(2) Date: Nov. 11, 2021

(87) PCT Pub. No.: WO2020/231993
PCT Pub. Date: Nov. 19, 2020

(65) Prior Publication Data
US 2022/0249284 A1    Aug. 11, 2022

Related U.S. Application Data

(60) Provisional application No. 62/847,145, filed on May 13, 2019.

(51) Int. Cl.
*A61F 9/007* (2006.01)
*A61B 3/00* (2006.01)
(Continued)

(52) U.S. Cl.
CPC ........ *A61F 9/00781* (2013.01); *A61B 3/0041* (2013.01); *A61B 3/16* (2013.01);
(Continued)

(58) Field of Classification Search
CPC .......... A61F 9/00781; A61F 2250/0001; A61F 2250/0002; A61B 3/0041; A61B 3/16;
(Continued)

(56) References Cited

U.S. PATENT DOCUMENTS

| | | |
|---|---|---|
| 4,037,604 A | 7/1977 | Newkirk |
| 4,898,158 A | 2/1990 | Daly et al. |

(Continued)

OTHER PUBLICATIONS

International Search Report and Written Opinion from corresponding International Application No. PCT/US2020/032478, mailed Aug. 11, 2020; 11 pages.

*Primary Examiner* — Nicholas J. Weiss
*Assistant Examiner* — Gabriella E Burnette
(74) *Attorney, Agent, or Firm* — Haynes and Boone, LLP

(57) ABSTRACT

A shunt valve for removing biofluid from an eye of a user, the valve including a tubular body defining an inlet and a plurality of outlets formed through a wall of the tubular body; a plunger accommodated within the tubular body and fluidically coupled to the inlet; wherein the plunger is movable relative to the plurality of outlets; and an energized material coupled to the plunger and the tubular body; wherein the energized material is compressible to expose a portion of the plurality of outlets dependent on the pressure applied to the energized material.

20 Claims, 11 Drawing Sheets

(51) Int. Cl.
  *A61B 3/16*    (2006.01)
  *A61B 5/00*    (2006.01)
  *A61M 39/24*   (2006.01)

(52) U.S. Cl.
  CPC .......... *A61B 5/0022* (2013.01); *A61B 5/6821* (2013.01); *A61B 5/6847* (2013.01); *A61B 5/746* (2013.01); *A61M 39/24* (2013.01); *A61F 2250/0001* (2013.01); *A61M 2039/242* (2013.01); *A61M 2205/3331* (2013.01)

(58) Field of Classification Search
  CPC ... A61B 5/0022; A61B 5/6821; A61B 5/6847; A61B 5/746; A61B 5/03; A61B 3/0016; A61M 39/24; A61M 2039/242; A61M 2205/3331; A61M 27/002
  See application file for complete search history.

(56) References Cited

U.S. PATENT DOCUMENTS

| | | | |
|---|---|---|---|
| 6,007,511 | A | 12/1999 | Prywes |
| 2014/0135916 | A1* | 5/2014 | Clauson .............. A61F 9/00781 623/6.11 |
| 2014/0246024 | A1 | 9/2014 | Cragg et al. |
| 2014/0275923 | A1 | 9/2014 | Haffner et al. |
| 2015/0122051 | A1* | 5/2015 | Frey ...................... G01F 1/3266 73/861.24 |
| 2015/0126889 | A1 | 5/2015 | Frey et al. |
| 2018/0028794 | A1 | 2/2018 | Browd et al. |
| 2018/0243083 | A1* | 8/2018 | Gupta .................... H02J 50/80 |
| 2018/0271700 | A1* | 9/2018 | Alhourani ................ A61B 3/16 |
| 2019/0105147 | A1* | 4/2019 | Vidlund ................... A61F 2/06 |

* cited by examiner

BIOFLUID SHUNT VALVE WITH SHEATH AND MONITORING DEVICE

CROSS-REFERENCE TO RELATED APPLICATIONS

This application is a U.S. National Phase Entry of International Application No. PCT/US2020/032478, filed May 12, 2020, which claims the benefit of, and priority to, U.S. Provisional Application No. 62/847,145, filed May 13, 2019, the entire disclosures of which are hereby incorporated herein by reference.

TECHNICAL FIELD

The present disclosure relates generally to devices and methods for venting and monitoring biofluids within a patient, including venting a biofluid within an eye of a patient and/or measuring a pressure and flow rate of the biofluid exiting the eye.

BACKGROUND DESCRIPTION

Glaucoma, which progressively reduces the visual field in sufferers, is usually caused by excessive intraocular pressure (IOP) that damages the optic nerve. Typically, pharmaceutical agents are used to initially treat the high pressure, but eventually surgery may be required. Surgery often involves implanting a shunt that goes through the trabecular meshwork to provide a low fluidic resistance path for the excess aqueous humour to drain out of the eye. Conventional shunts typically use the scleral flap of the eye as a simple regulator for the shunt. The scleral flap, however, is often too loose and the IOP drops excessively due to the low fluidic resistance. Conversely, when the scleral flap is sutured too tight, it will not sufficiently lower the IOP. As such, a shunt that does not require the sclera flap for regulation of IOP is needed.

Often, pharmaceutical agents are used to treat glaucoma even after surgery. The use of these pharmaceutical agents requires adherence to dosage schedules and knowledge of the IOP of the patient. The IOP for a given patient can vary significantly based on time of day, exercise, recency of medication use, and other factors. As such, any single measurement is subject to uncertainty. Thus, monitoring the IOP of the patient over a period of time provides a better indication to the health status of the patient. IOP measurements performed in a doctor's office typically only take place once or twice per year. These infrequent measurements are less capable to account for variation in patient IOP. Annual or biannual measurements in a doctor's office may also grow stale or obsolete due to time lag since the previous measurement. Moreover, the IOP should be closely monitored after the surgery to ensure shunt effectiveness. Frequent measurements at home could allow for better treatment via pharmaceutical agents and better monitoring of shunt effectiveness.

DETAILED DESCRIPTION

Figure 1:
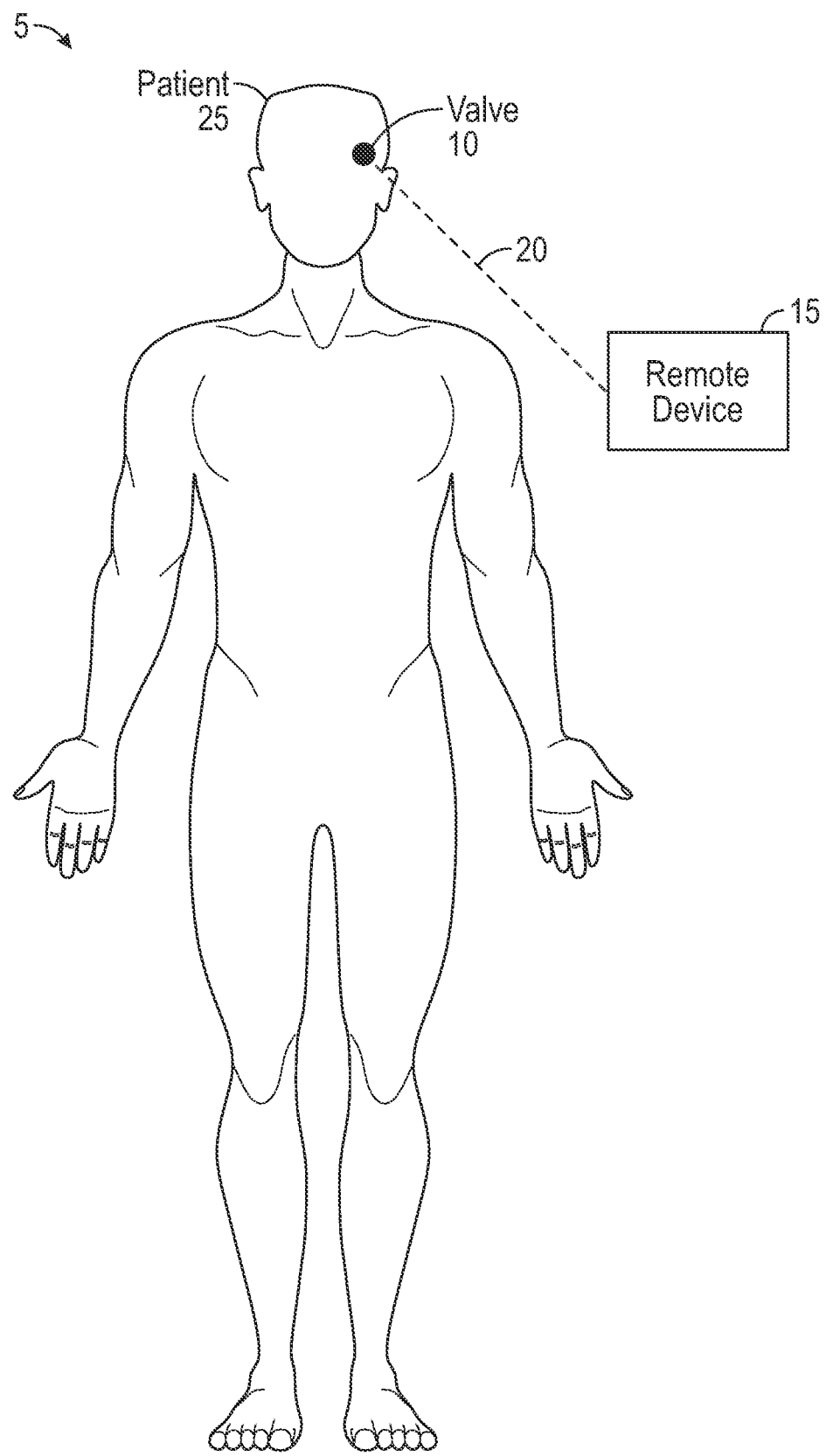
FIG. 1 is a diagrammatic illustration of a biofluid regulation and monitoring system and a patient, according to an example embodiment, the biofluid regulation and monitor system including a shunt and a remote device.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A system generally referred to by the reference numeral 5, as illustrated in FIG. 1, is an example biofluid regulation and monitoring system that vents biofluid from one portion of the patient to another portion of the patient and/or to outside of the patient while monitoring the pressure and flow rate of the biofluid. In some embodiments, the system 5 is used to vent aqueous humour from an eye of the patient. The system 5 provides improved regulation of IOP over conventional methods that rely on the use of a scleral flap of an eye, which can change over time, and that is dependent on a surgeon's skill for proper adjustment. Furthermore, the system 5 can provide, with permission from the patient, valuable information to eye care or other healthcare professionals to monitor the effectiveness of the system 5 and/or supplemental pharmaceutical agents in regulating the IOP. However, the system 5 may also be used to vent cerebrospinal fluid (CSF) from the brain. As such, while the system 5 is described herein as regulating and monitoring IOP in the eye of the patient, the system 5 is capable of being used in a variety of locations to regulate and monitor a variety of biofluids.

Figure 2:
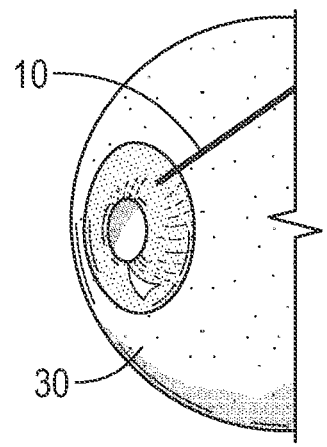
FIG. 2 is a perspective view of the valve of FIG. 2 positioned in an eye of the patient according to an example embodiment.

In an example embodiment and as illustrated in FIG. 1, the system 5 generally includes a local device or shunt valve 10 and a remote device 15 in communication via a network 20. Generally, the shunt valve 10 is configured to be implanted and/or is implanted in a user or a patient 25. For example, and as illustrated in FIG. 2, the valve 10 is an implantable, medical-grade valve 10 that is implanted in an eye 30 to regulate and monitor aqueous humor in the eye 30 of the patient 25.

Figure 3:
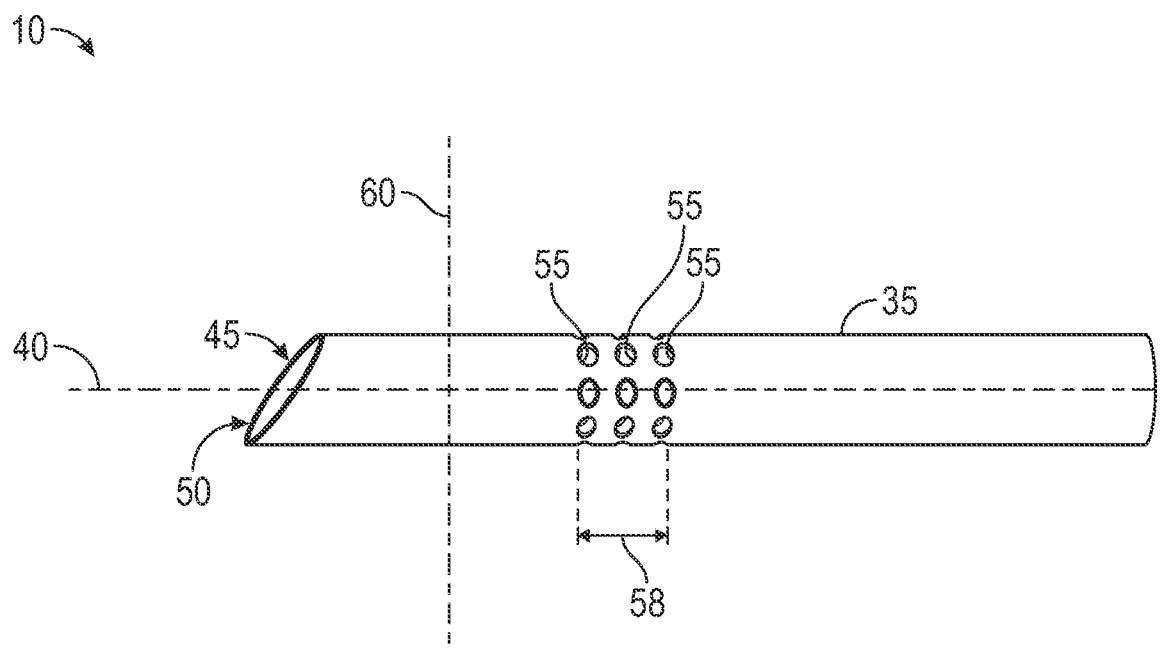
FIG. 3 is a perspective view illustration of the shunt of FIG. 2, according to an example embodiment.

Generally, and as illustrated in FIG. 3, the shunt valve 10 includes a body 35 having a longitudinal axis 40. In some embodiments and as illustrated, the body 35 is a tubular body and is referenced in some places herein as a tubular body 35. Generally, a passageway 45 extends within the interior of the tubular body 35 along the length (measured along the longitudinal axis 40) of the tubular body 35. The tubular body 35 forms a valve inlet 50 and a plurality of valve outlets 55. In some embodiments, the outlets in the plurality of valve outlets 55 are longitudinally and circumferentially spaced along a length 58 of the tubular body 35. In some embodiments, the tubular body 35 is positioned across a sclera 60 such that the valve inlet 50 is in fluid communication with an anterior chamber and/or the trabecular meshwork of the eye 30 and the sclera 60 is positioned between the plurality of outlets 55 and the valve inlet 50. Generally, the plurality of outlets 55 is in fluid communication with another portion of the patient 25 such that the shunt valve 10 vents biofluid from the eye 30. The shunt valve 10 is thus a shunt that allows movement of fluid from one part of the body to another.

Figure 4:
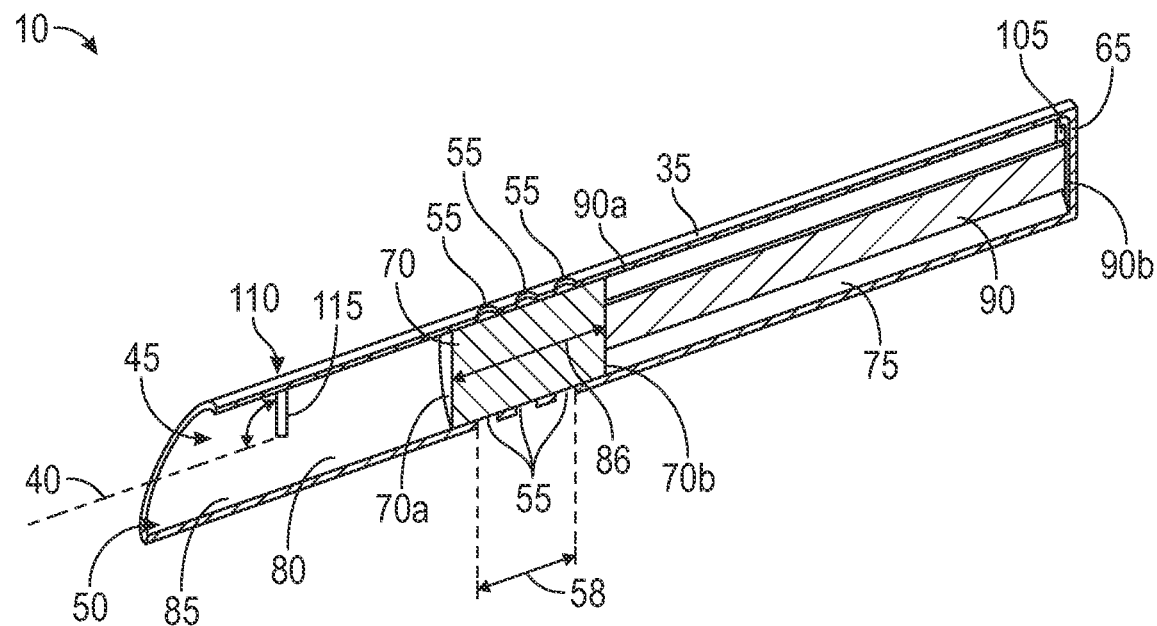
FIG. 4 is a perspective, sectional view of the shunt of FIG. 3 in a closed position, according to an example embodiment.

In some embodiments and as illustrated in FIG. 4, the valve inlet 50 is positioned on one end of the tubular body 35 and the other end of the tubular body 35 is sealed or blocked by a cap 65. In some embodiments, the shunt valve 10 also includes a plunger 70 accommodated in the passageway 45 and movable along the longitudinal axis 40 of the tubular body 35. Generally, the plunger 70 is cylindrical with a first and second opposing faces 70a, 70b. The plunger 70 is sized to fluidically isolate one portion of the passageway 45 to form a valve chamber 75 between the cap 65 and the second face 70b of the plunger 70. The plunger 70 also forms a fluid chamber 80 between the first face 70a of the plunger 70 and the valve inlet 50. As such, the first face 70a of the plunger 70 is in fluid communication with the valve inlet 50 and a fluid pressure of a fluid entering the valve inlet 50 is applied to the first face 70a of the plunger 70. The plunger 70 slides against an interior or internal surface 85 of the tubular body 35 to increase the size of the fluid chamber 80 while simultaneously decreasing the size of the valve chamber 75. In some embodiments, the plunger 70 is water or fluid impermeable such that the valve chamber 75 is fluidically isolated from the fluid chamber 80. Generally, the plunger 70 has a length 86 (measured along the longitudinal axis 40) that is greater than or equal to the length 58.

Figure 5:
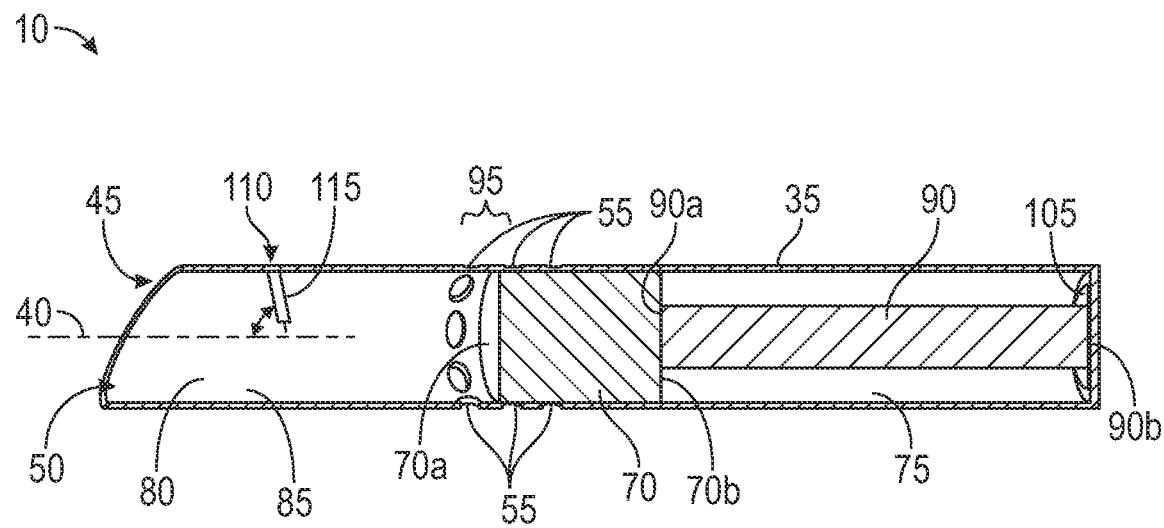
FIG. 5 is a perspective, sectional of the shunt of FIG. 3 in a partially open position, according to an example embodiment.
Figure 6:
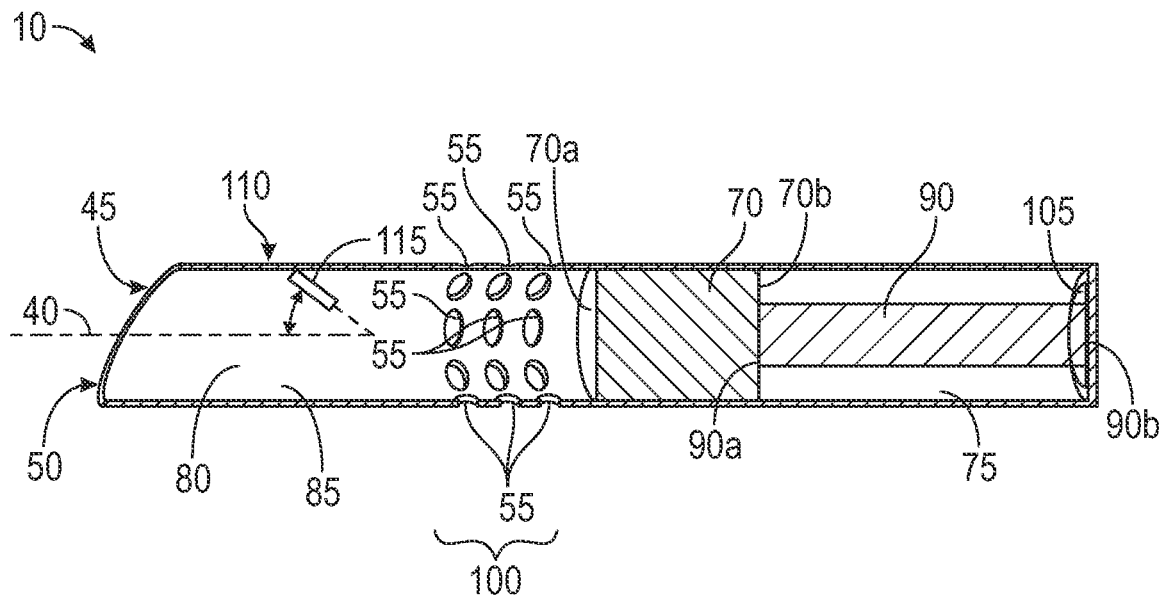
FIG. 6 is a perspective, sectional of the shunt of FIG. 3 in an open position, according to an example embodiment.

In some embodiments, the shunt valve 10 also includes an energized material 90 positioned between the cap 65 and the plunger 70. The energized material 90 has a first end 90a and an opposing second end 90b, with the second end 90b being coupled to the cap 65 and the first end 90a being coupled to the plunger 70 such that movement of the plunger 70 along the longitudinal axis 40 and towards the cap 65 compresses the energized material 90. The energized material 90 can be a spring or other compressible material. For simplicity purposes, the term "spring constant" is used herein to describe the stiffness of the energized material 90 and corresponds to the amount of force that must be applied to the energized material 90 to change the length (measured along the longitudinal axis 40) of the energized material 90. The use of the term spring constant does not require the use of a spring. For example, the energized material 90 may be or include any one or more of a pair of repulsing magnets, a compressed gas, and a constrained compliant material such as, for example, a compressed dry foam sponge or a stretched rubber band. Generally, the energized material 90 is selected such that, when an acceptable pressure is applied to the first face 70a of the plunger 70, the plunger 70 is positioned such that the shunt valve 10 is in a shunt valve 10 closed position as illustrated in FIG. 4. Generally, the position of the plunger 70 relative to the cap 65 is dependent upon the pressure applied to the first face 70a of the plunger 70 and the spring constant of the energized material 90. When the pressure is slightly above the acceptable pressure and as illustrated in FIG. 5, the plunger 70 moves slightly towards the cap 65, from the valve closed position to a first valve open position. When in the first valve open position, a portion 95 of the plurality of outlets 55 is in fluid communication with the fluid chamber 80. When the pressure continues to increase above the acceptable pressure, the plunger 70 moves further towards the cap to a second valve open position as illustrated in FIG. 6. When in the second valve open position, a larger portion 100 of the outlets 55 in is fluid communication with the fluid chamber 80. As the number of total outlets varies upon the pressure applied to the first face 70a, the shunt valve 10 is a variable valve. The acceptable pressure and movement of the plunger 70 in response to the eye pressure is a function of the size of the first face 70a and the spring constant of the energized material 90. Any range of pressure can trigger or open the shunt valve 10. In some embodiments, the acceptable pressure is 8 mmHg or below.

In some embodiments, the shunt valve 10 includes a pressure sensor 105 that is positioned to detect pressure of the biofluid entering the valve inlet 50. In this example, the pressure sensor 105 detects the pressure of aqueous humour in the eye 30. In some embodiments and illustrated in FIGS. 4-6, the pressure sensor 105 is positioned between the cap 65 and the energized material 90. In this embodiment, the pressure sensor 105 measures the force applied by the second end 90b of the energized material 90, which equals the force applied by the plunger 70 on the first end 90a of the energized material 90. With the area of the first face 70a and the spring constant of the energized material 90 are known, the pressure of the fluid is determined. However, the shunt valve 10 can include a wide variety of pressure sensors. For example, the shunt valve 10 may include a proximity sensor positioned within the valve chamber 75 and/or the fluid chamber 80 and configured to detect the movement of the plunger 70. In some embodiments, the proximity sensor(s) are optical sensors or magnetic sensors if the plunger 70 has a metallic core. As the movement of the plunger 70 relates to the pressure applied to the first face 70a of the plunger 70, the pressure applied to the first face 70a can be detected based on the movement of the plunger 70. Additionally, a pressure sensor 105 may be formed within the plunger 70 such that a portion of the pressure sensor 105 is in fluid communication with the fluid accommodated in the fluid chamber 80. For example, the pressure sensor 105 may form a portion of the first face 70a or the pressure sensor 105 may be accommodated in the valve chamber 75 and a pilot line extends into the eye 30 or into the fluid chamber 80.

In some embodiments, the shunt valve 10 also includes a flow sensor 110. As illustrated in FIGS. 4-6, the flow sensor 110 may include a cantilevered arm 115 that is coupled to the tubular body 35 and that extends within the fluid chamber 80. In some embodiments, the flow sensor 110 is fabricated through a MEMS process and is configured to have a sensitivity of a nanoliter per minute. In one embodiment, the cantilevered arm 115 rotates relative to the internal surface 85 of the tubular body 35. The position of the cantilever arm 115 relative to the internal surface 85 reflects the flow rate of the fluid venting via the shunt valve 10. At a zero-flow rate, such as when the shunt valve 10 is in the closed position (illustrated in FIG. 4), the cantilever arm 115 is generally perpendicular to the longitudinal axis 40 of the tubular body 35. At a low flow rate, such as when the shunt valve 10 is in the partially open position or the first valve open position (illustrated in FIG. 5), the cantilever arm 115 is approximately at an 80-degree angle relative to the longitudinal axis 40. Moreover, at a high flow rate, such as when the shunt valve 10 is in the fully open position or second valve open position (illustrated in FIG. 6), the cantilever arm is approximately at a 45-degree angle relative to the longitudinal axis 40. The specific angles of the cantilever arm 115 relative to the longitudinal axis 40 can vary, but generally the movement of the cantilevered arm 115 relative to the internal surface 85 increases with higher fluid flow through the fluid chamber 80. In some embodiments, the cantilever arm 115 is coupled to a portion of the tubular body 35 that is transparent or translucent and the cantilever arm 115 has a color that is easily viewable (e.g., black, blue) through the tubular body 35. In that example, the position of the cantilever arm 115 can be viewed when the shunt valve 10 is implanted in the eye 30 of the patient 25. In another embodiment, the cantilever arm 115 includes a piezo resistive material and a wire couples the cantilever arm 115 to a sensor that measures electrical resistance in the cantilevered arm 115 to detect a flow rate based on movement of the cantilever arm 115. In some embodiments, a plurality of flow sensors identical to the flow sensor 110 is positioned within the fluid chamber 80. The plurality of flow sensors could be spaced longitudinally along the axis 40 and/or circumferentially along the internal surface 85.

In other embodiments, the flow sensor 110 includes the pressure sensor 105 and another pressure sensor that monitors the pressure external to the tubular body 35 and near the plurality of outlets 55. In this example, the flow rate is determined based on the pressure differential and the number and size of outlets that are in fluid communication with the fluid chamber 80. That is, the pressure sensor 105 detects the pressure applied to the first face 70a and the position of the plunger 70 within the passageway 45. As such, the number of outlets in fluid communication with the fluid chamber 80 is known. When the size and number of outlets in fluid communication with the fluid chamber 80 and the pressure differential across the plurality of outlets 55 are known (based on the pressure sensor 105 and the another sensor), the predicted flow rate can be determined. In some embodiments, the other sensor is omitted, and the predicted flow rate is calculated based on a predicted or expected pressure external to the tubular body 35 and near the plurality of outlets 55. In some embodiments and when the predicted flow rate is calculated based on the predicted or expected pressure external to the tubular body 35 and near the plurality of outlets 55, an assumption is made regarding a number of blocked outlets (if any).

Figure 7:
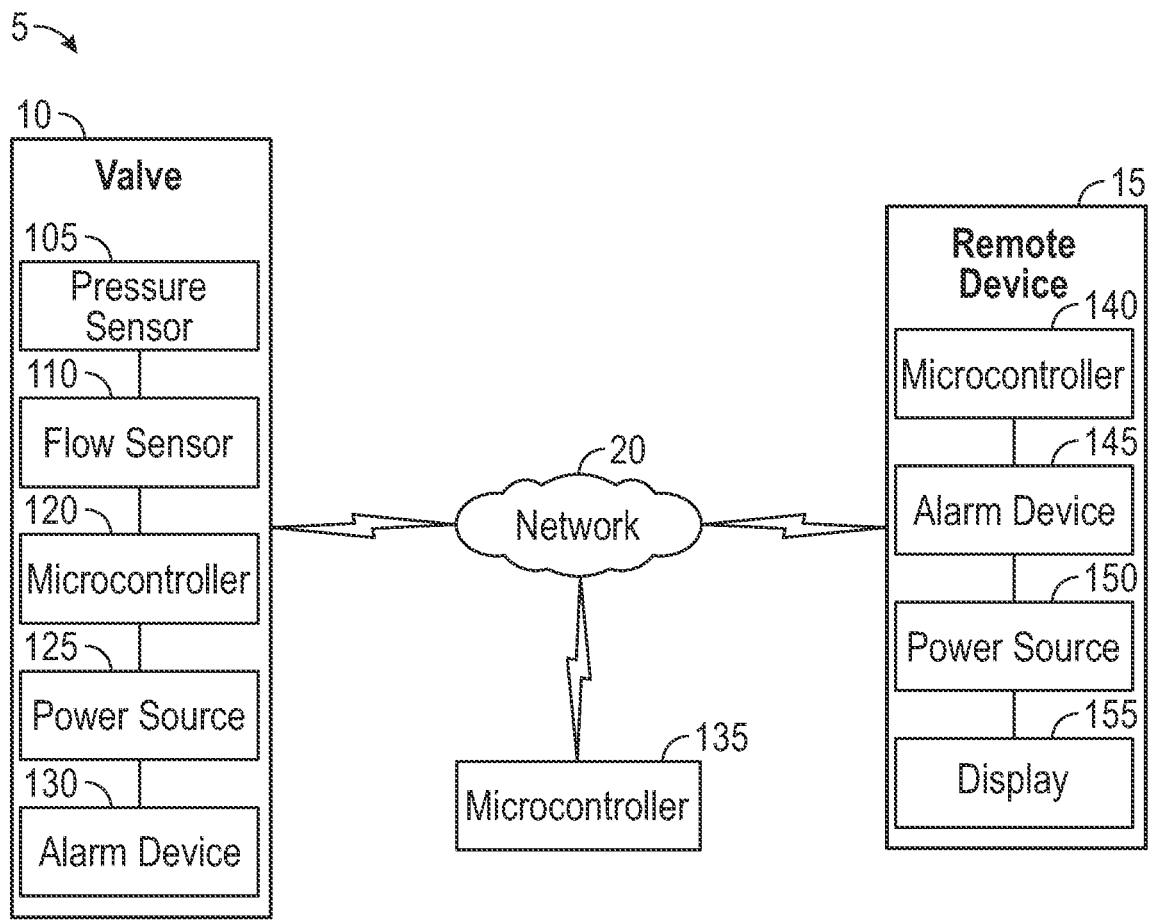
FIG. 7 is a diagrammatic illustration of the biofluid regulation and monitoring system of FIG. 1, according to an example embodiment.

FIG. 7 is a diagrammatic illustration of the humor regulation and monitoring system 5, according to an example embodiment. As illustrated and in some embodiments, the shunt valve 10 includes the pressure sensor 105, the flow sensor 110, a microcontroller 120, a power source 125, and an alarm device 130 operably coupled together. The shunt valve 10 is configured to be in wireless communication with the remote device 15 and/or a microcontroller 135 via the network 20. In some embodiments, the remote device 15 includes a microcontroller 140, an alarm device 145, a power source 150, and a display 155 operably coupled together.

Generally, the microcontroller 120 is in communication with the pressure sensor 105 and the flow sensor 110 and is operably coupled to the power source 125. Generally, the microcontroller 120 includes a processor and a memory. In some embodiments and when the shunt valve 10 is configured for wireless communication with the remote device 15, the microcontroller 120 is configured for wireless communication (e.g., using cellular, wi-fi, or Bluetooth technologies) with the microcontroller 140 of the remote device 15 and/or the microcontroller 135 via the network 20. Wireless connectivity may be provided by a transceiver (not shown) coupled to the microcontrollers 120, 135, and 140.

In some embodiments, the power sources 125 and 150 are or include a battery or the like. However, in some embodiments the power source 125 is the user or is generated by movement of the user. For example, in some embodiments, the power source is harvested energy from the body of the patient 25 (e.g., harvest from motion, temperature, both motion and temperature). In other embodiments, the power source is harvested energy from ambient light/sunlight via a photovoltaic device. In some embodiments, the battery is non-rechargeable, but in other embodiments the battery is rechargeable.

In some embodiments, the alarm device 130 is a visual indicator displayed between the valve inlet 50 and the plurality of outlets 55. In some embodiments, the visual indicator is the flow sensor 110 when the flow sensor 110 is coupled to a portion of the tubular body 35 that is transparent or translucent and the cantilever arm 115 has a color that is easily viewable (e.g., black, blue, etc.) through the tubular body 35. In that example, the visual indicator is movable between a variety of positions or configurations such as the zero-flow position as illustrated in FIG. 4, a low flow position as illustrated in FIG. 5, and a higher flow position as illustrated in FIG. 6. Generally, the cantilever arm 115 being in the low flow position indicates that the detected pressure is equal to or below an acceptable biofluid pressure. The cantilever arm 115 being in the low flow position and the higher flow position indicate that the detected pressure is above the acceptable biofluid pressure.

In an example embodiment, the microcontroller 140 is identical or substantially similar to the microcontroller 120 in that it includes a memory and a processor.

In an example embodiment, the alarm device 145 of the remote device 15 is or includes a speaker, a haptic alert generator, and/or the display 155. For example, the display 155 is the alarm device 145 when a visual alarm is displayed on the display 155. However, and as noted above, the alarm device 145 may be a speaker when the alarm is an audible alarm. The haptic alert generator may include an eccentric rotating mass actuator, a linear actuator, a "rumble pack" and the like. In some embodiments, the remote device 15 is a smart phone, tablet computer, personal digital assistant (PDA), or personal computing device (PCDs), or the like.

In an example embodiment, the network 20 includes the Internet, one or more local area networks, a Bluetooth low energy network, one or more wide area networks, one or more cellular networks, one or more wireless networks, one or more voice networks, one or more data networks, one or more communication systems, and/or any combination thereof.

Figure 8:
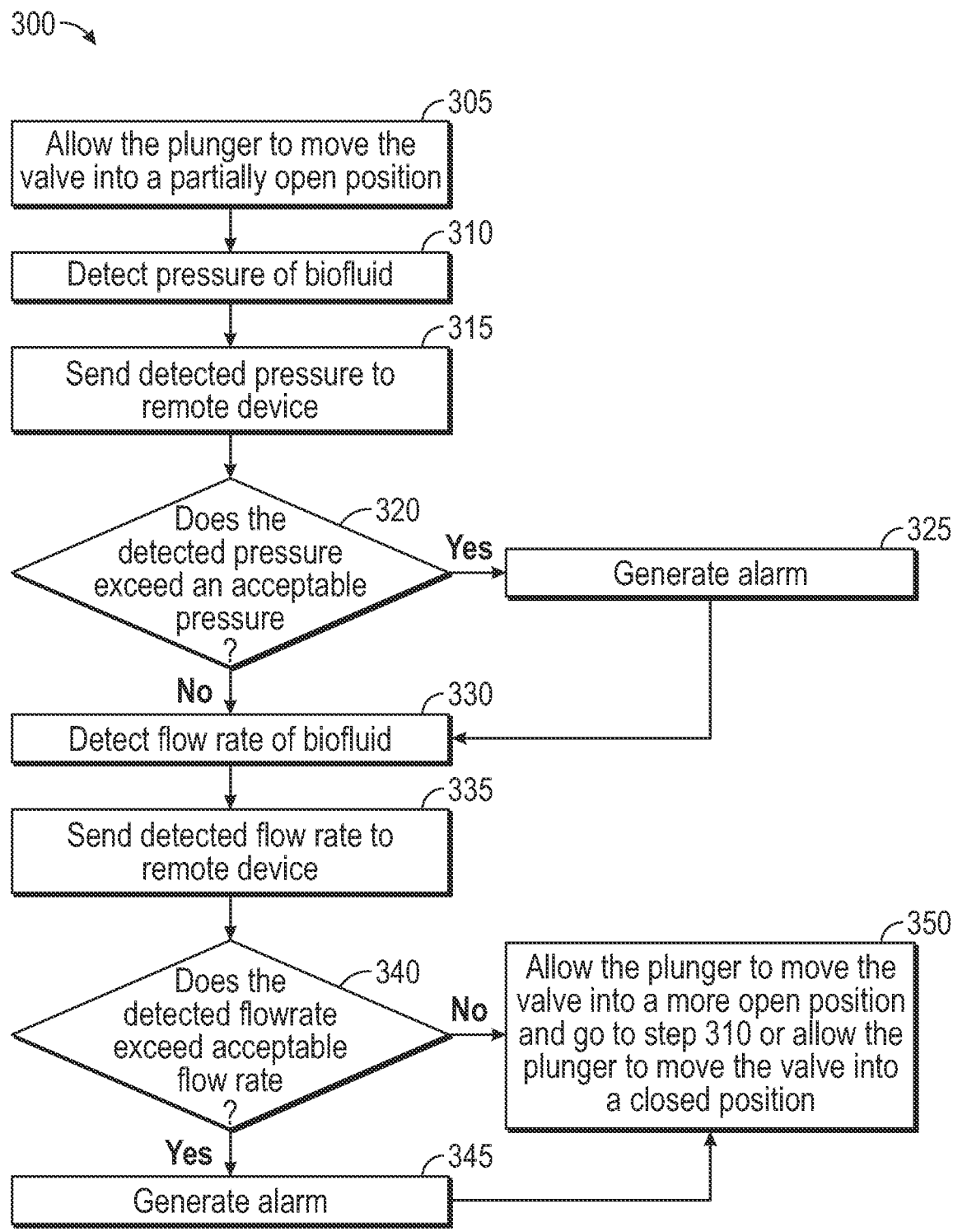
FIG. 8 is a flow chart illustration depicting a method of operating the biofluid regulation and monitoring system of FIGS. 1-7, according to an example embodiment.

In an example embodiment, as illustrated in FIG. 8 with continuing reference to FIGS. 1-7, a method 300 of operating the system 5 includes allowing the plunger 70 to move the shunt valve 10 into a partially open position at step 305; detecting the pressure of the biofluid at step 310; sending the detected pressure to the remote device 15 at step 315; determining if the detected pressure exceeds an acceptable pressure at step 320; if so, then generating an alarm at step 325; detecting the flow rate of the biofluid at step 330; sending the detected pressure to the remote device 15 at step 335; determining if the detected flow rate exceeds an acceptable flow rate at step 340; if so then generating an alarm at step 345; and allowing the plunger 70 to move the shunt valve 10 into a more open position and returning to the step 310 or allowing the plunger 70 to move the shunt valve 10 into a closed position at step 350.

At the step 305, the plunger 70 is allowed to move the shunt valve 10 into a partially open position. Generally, the plunger 70 compresses the energized material 90 in response to an increased pressure being applied to the first face 70a of the plunger 70, with the increased pressure associated or being the same as the pressure of the biofluid. In some embodiments, the step 305 includes the plunger 70 moving along the longitudinal axis 40 in a direction towards the cap 65. As illustrated in FIG. 5, as the plunger 70 moves toward the cap 65, the portion 95 of the plurality of outlets 55 is placed in fluid communication with the valve inlet 50 and the fluid chamber 80. As such, the biofluid in the eye 30 enters the valve inlet 50, enters the fluid chamber 80, and then exits the shunt valve 10 via the portion 95 of the plurality of outlets 55. The pressure that partially opens the shunt valve 10 is based upon the application and is dependent upon the spring constant of the energized material 90, surface area of the first face 70a of the plunger 70, etc.

At the step 310, the pressure of the biofluid is detected. In one embodiment, the pressure sensor 105 detects the pressure of the biofluid in the eye 30 and/or the biofluid in the fluid chamber 80 of the shunt valve 10. When the pressure sensor 105 is located between the cap 65 and the second end 90b of the energized material 90, the pressure sensor 105 measures the force applied by the energized material 90 to the pressure sensor 105 to determine the pressure applied to the first face 70a of the plunger 70. When the pressure sensor 105 is a proximity sensor, the pressure sensor 105 detects the location of the second face 70b and/or the first face 70a and, based on the spring constant of the energized material 90, determines the pressure applied to the first face 70a of the plunger 70 required to move the plunger 70 into its detected position. When the pressure sensor 105 is a pressure sensor 105 that is in fluid communication with the biofluid, the pressure sensor 105 detects the pressure of the biofluid directly.

At the step 315, the detected pressure is sent to the remote device 15. In some embodiments, the detected pressure is communicated to the remote device 15 via the network 20 continuously. In other embodiments, the detected pressure is sent to the remote device 15 after a predetermined period of time, such as for example every hour. In some embodiments, the microcontroller 120 wirelessly transmits the detected pressure data to the microcontroller 140 in the remote device 15 or to the microcontroller 135. However, in other embodiments, the microcontroller 120 transmits a summary of the detected pressure data to the microcontroller 140 and/or the microcontroller 135.

At the step 320, the system 5 determines whether the detected pressure exceeds an acceptable pressure. In some embodiments, the microcontroller 120 in the shunt valve 10 compares the detected pressure to a predetermined acceptable pressure stored in the microcontroller 120 to make a determination as to whether the detected pressure exceeds the acceptable pressure. When the microcontroller 120 determines whether the detected pressure exceeds the predetermined acceptable pressure, the detected, elevated pressure is then sent to the remote device 15. That is, in some embodiments the microcontroller 120 sends data only after a specific, detected event, such as the detected pressure exceeding the predetermined acceptable pressure or after a number of instances in which the detected pressure exceeds the acceptable pressure. However, in other embodiments, the microcontroller 140 in the remote device 15 determines whether the detected pressure exceeds the acceptable pressure based on the data received from the shunt valve 10.

At the step 325 and when the detected pressure exceeds the acceptable pressure, an alarm is generated via the alarm device 130 and/or the alarm device 145. In some embodiments, the remote device 15 generates the alarm by displaying a notification on the display 155 of the remote device 15, using a speaker to sound an alarm via the alarm device 145, and/or providing a haptic alert via the alarm device 145. In some embodiments, the alarm generated by the remote device 15 is configured to be viewed and/or received by the patient 25. However, in other embodiments, the remote device 15 is configured to be viewed and/or received by a health care provider when granted permission to do so by the patient 25. As noted above, the position of the cantilever arm 115 being in the low flow or high flow configuration is generating an alarm via the shunt valve 10.

At the step 330, the system 5 detects the flow rate of the biofluid flowing through the plurality of outlets 55. As noted above, the flow rate sensor 110 can include a cantilevered arm 115 and/or other elements that detect or predict the flow rate of the biofluid through the shunt valve 10.

At the step 335, the system sends the detected flow rate to the remote device 15. Generally, the step 335 is similar to the step 315. Thus, additional details regarding the step 335 will not be provided here.

At the step 340, the system 5 determines whether the detected flow rate exceeds an acceptable flow rate. Generally, the step 340 is similar to the step 320 except that the data compared relates to flow rate instead of pressure. Thus, additional details regarding the step 340 will not be provided here.

At the step 345, the system generates an alarm. Generally, the step 345 is similar to the step 325. Thus, additional details regarding the step 345 will not be provided here.

At the step 350, the plunger 70 is allowed to move the shunt valve 10 into a more open position and then the method starts again at the step 310 or the plunger 70 is allowed to move the shunt valve 10 into the closed position. If the pressure increases even after the steps 305-345, then the plunger 70 is moved further towards the cap 65 and a larger portion of the plurality of outlets 55 is placed in fluid communication with the valve inlet 50 and the fluid chamber 80. The larger portion includes a larger combined outlet than a combined outlet associated with the portion 95. The method 300 is repeated until the shunt valve 10 is in a fully open position with the portion 100 of the plurality of outlets 55 in fluid communication with the valve inlet 50 and the fluid chamber 80, as illustrated in FIG. 6. The portion 100 includes a larger combined outlet than a combined outlet associated with the portion 95.

As shunt valve 10 opens further in response to the pressure of the biofluid increasing, in some embodiments the outlets 55 that are positioned closer to the cap 65 are larger in size and/or greater in number than the outlets 55 that are positioned closer to the valve inlet 50. The size and number of outlets 55 can be based on the type of biofluid expected to flow through the shunt valve 10 and/or the types of cells within the biofluid expected to flow through the shunt valve 10.

In some embodiments, the pressure data and the flow rate data may be stored in the microcontroller 120, the microcontroller 135, the microcontroller 140 or any combination thereof. In some embodiments, a patient profile of the patient 25 is stored in one or more of the microcontrollers 120, 135, 140, such that the patient profile is refined with every use of the system 5 by the patient 25. In some embodiments, any one of the microcontrollers 120, 135, 140 compares the most current detected pressure and/or flow rate to a historical detected pressure and flow rate to determine whether the detected pressures and flow rates increase over time or the frequency at which the shunt valve 10 is opened is increased, which might indicate that a condition is worsening. Regardless, in some embodiments, the system 5 tracks the condition of the patient 25 using the detected pressure and/or the detected flow rates. In some embodiments, the system 5 tracks the performance of the shunt valve 10 to identify or predict failure of the device.

Figure 9:
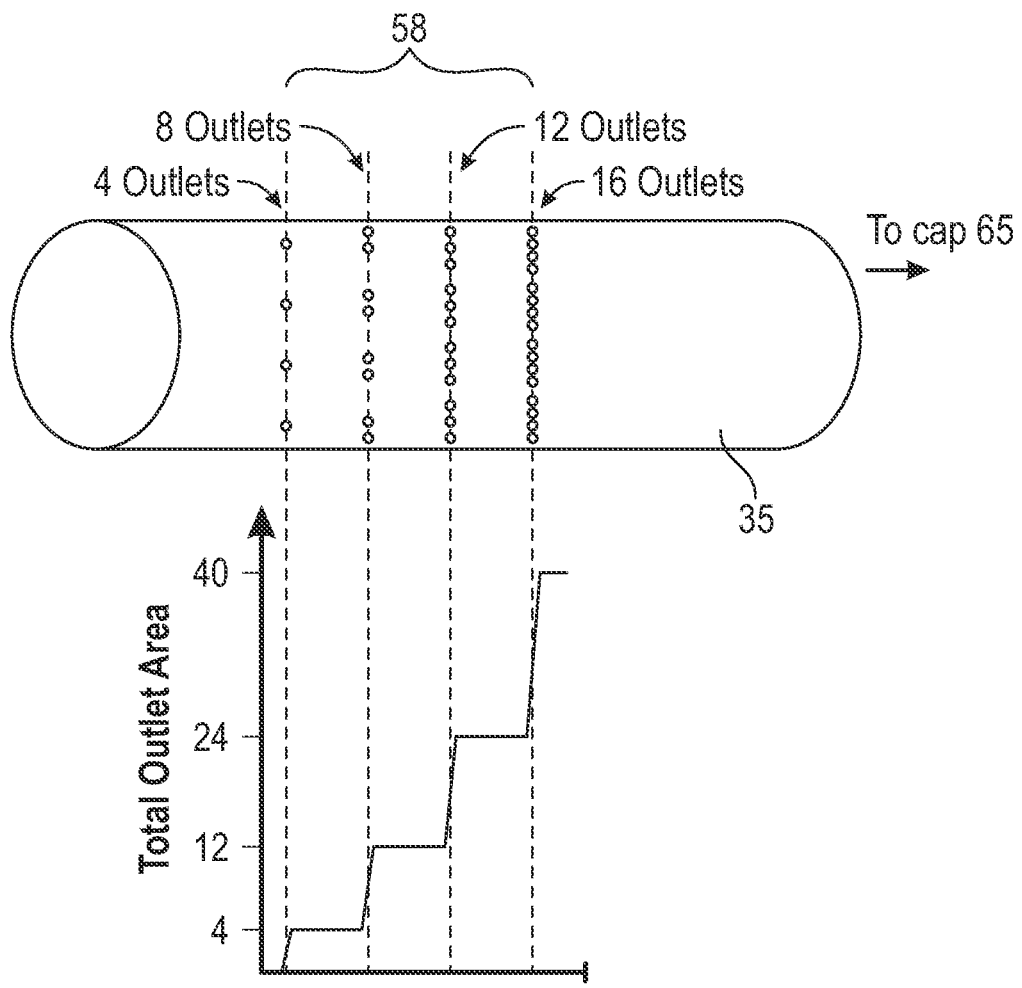
FIG. 9 is a diagrammatic illustration of the shunt of FIG. 2, according to an example embodiment.
Figure 10:
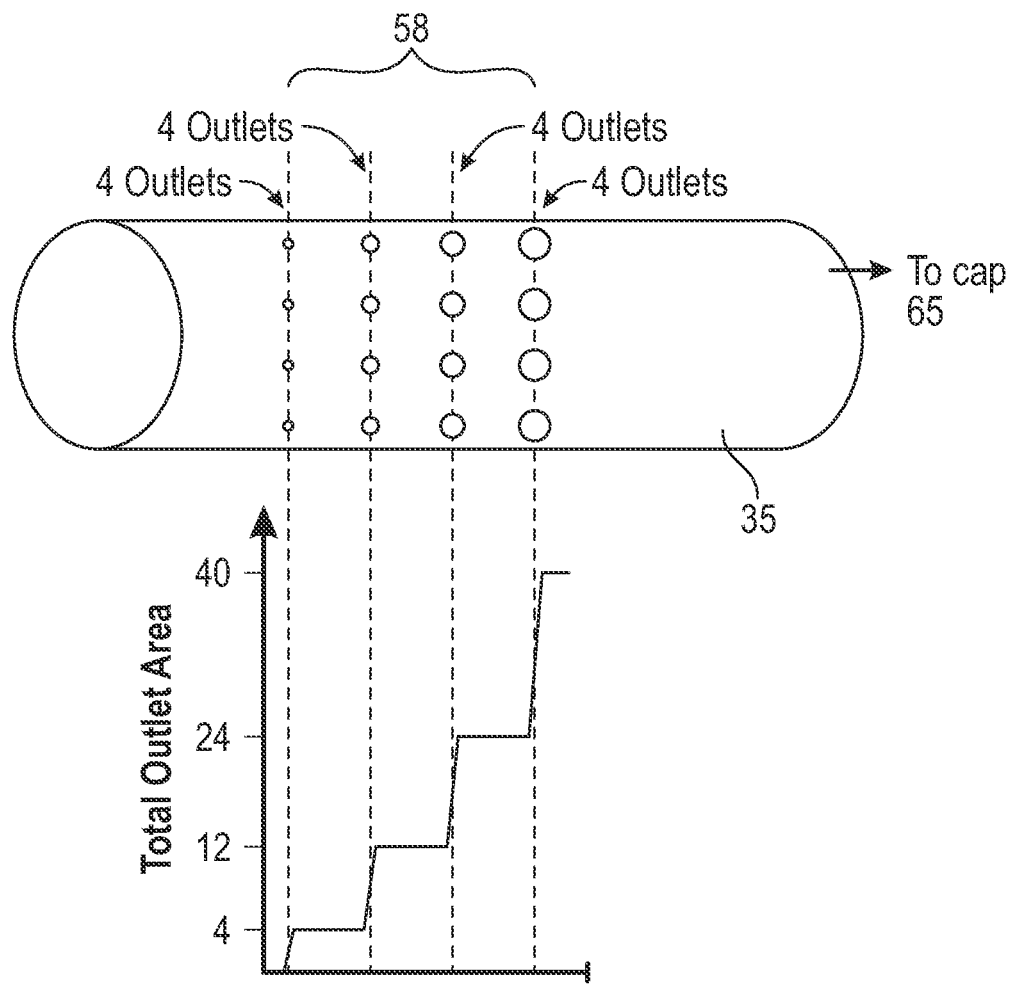
FIG. 10 is a diagrammatic illustration of the shunt of FIG. 2, according to another example embodiment.
Figure 11:
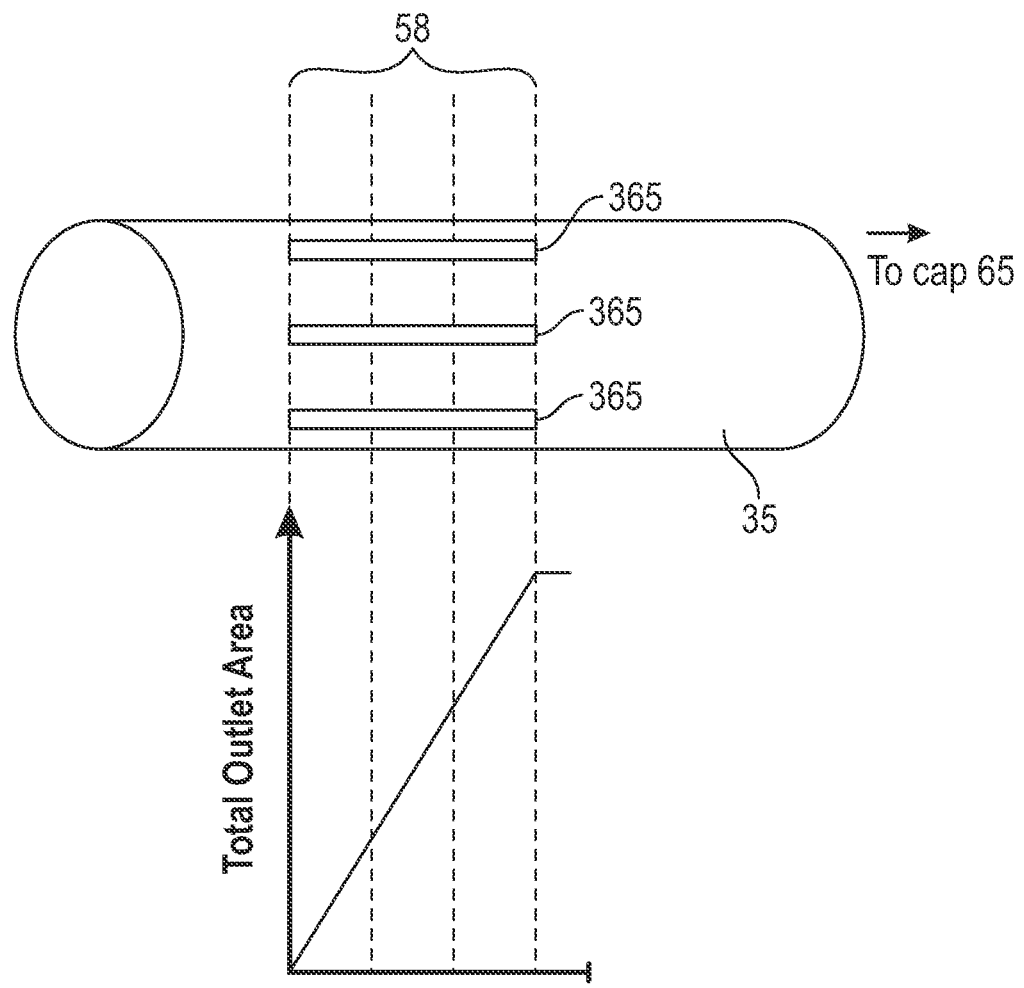
FIG. 11 is a diagrammatic illustration of the shunt of FIG. 2, according to yet another example embodiment.

In some embodiments, and as illustrated in FIGS. 9, 10, and 11, the size, the number, pattern, and/or the shape of the outlets in the plurality of outlets 55 increase or decrease as a function of the distance from the cap 65. In some embodiments and as illustrated in FIG. 9, the size of the outlets 55 is generally consistent along the length 58 but the number of outlets 55 that are circumferentially spaced increase along the length 58 as the distance to the cap 65 decreases. FIG. 9 also includes a graph depicting the total outlet area as a function of plunger 70 movement along the length 58. Generally, the total outlet area is the combined area of the outlets placed in fluid communication with the fluid chamber 80. The total outlet area increases in a non-linear fashion due to the increase in the number of outlets along the length 58. In some embodiments and as illustrated in FIG. 10, the number of the outlets 55 is generally consistent along the length but the size of outlets 55 that are circumferentially spaced increase along the length 58 as the distance to the cap 65 decreases. FIG. 10 also includes a graph depicting the total outlet area as a function of plunger 70 movement along the length 58. The total outlet area increases in a non-linear fashion due to the increase in size of outlets along the length 58. In some embodiments and as illustrated in FIG. 11, the plurality of outlets 55 includes or form slots 365 that extend longitudinally along the length 58. FIG. 11 also includes a graph depicting the total outlet area as a function of plunger 70 movement along the length 58. The total outlet area increases in a linear fashion due the slots having consistent dimensions along the length 58. In some embodiments, the plurality of outlets 55 are sized and configured such that the shunt valve 10 functions even if a portion of the outlets are clogged or otherwise fail.

In some embodiments, the size and/or pattern formed by the outlets 55 are based on the spring constant and whether the compression of the energized material 90 occurs linearly. That is, if the increase in force is directly proportional to an increase in compression, then an increase of the total outlet area may also be linear. However, if the increase in force is not directly proportional to an increase in compression of the energized material 90, then the total outlet area may increase exponentially or in an otherwise non-linear fashion.

Figure 12:
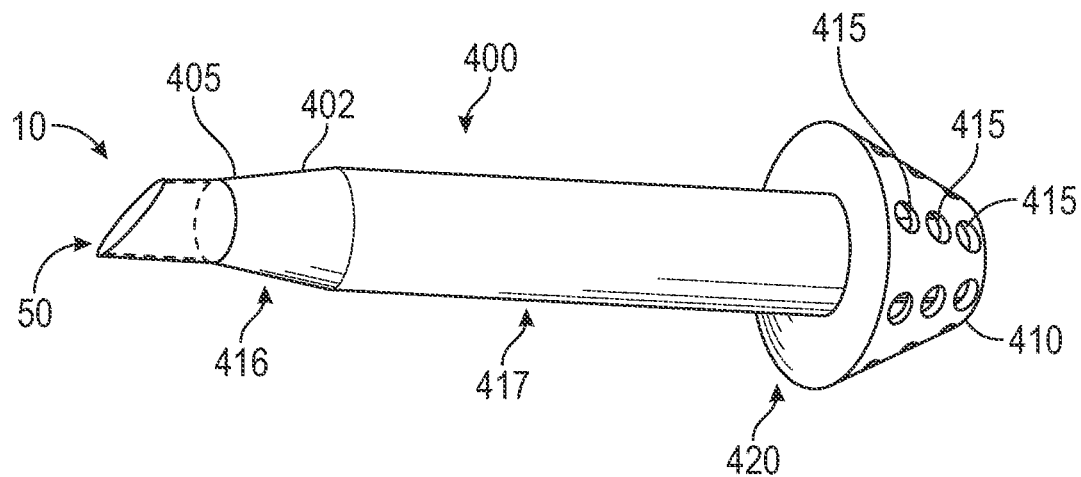
FIG. 12 is a perspective view of a sheathed shunt that includes a sheath and the shunt of FIG. 2, according to an example embodiment.
Figure 13:
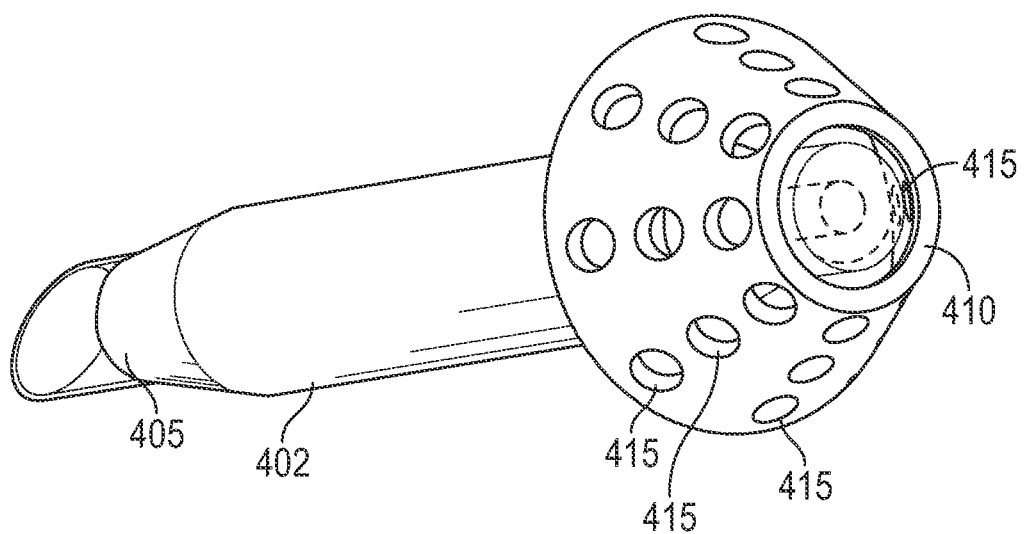
FIG. 13 is another perspective view of the sheathed shunt of FIG. 12, according to an example embodiment.
Figure 14:
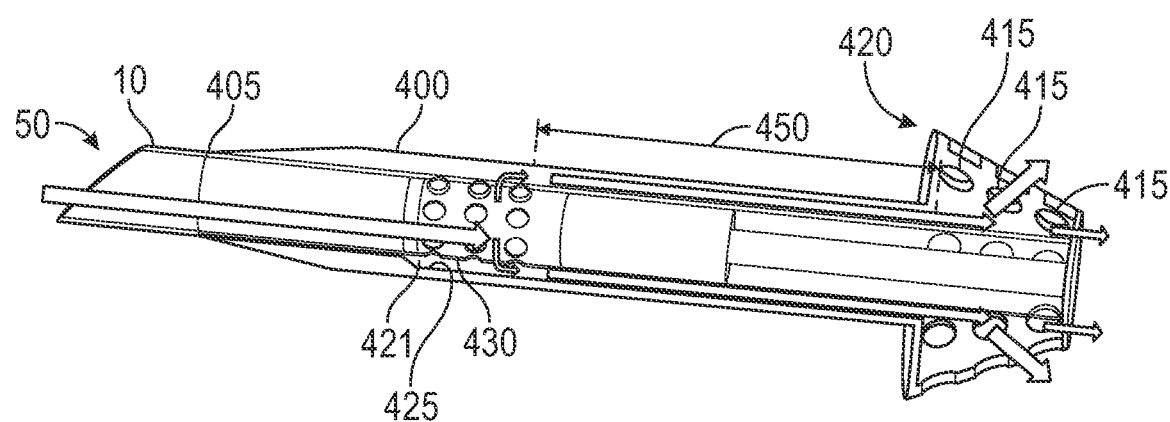
FIG. 14 is a sectional view of the sheathed shunt of FIG. 12, according to an example embodiment.

In some embodiments and as illustrated in FIGS. 12, 13, and 14, a sheath 400 is disposed about at least a portion of the shunt 10. The sheath 400 generally has a tubular body 402 that forms a first end 405 and an opposing second end 410. In some embodiments, the first end 405 is coupled to the shunt 10 at location between the inlet 50 and the plurality of outlets 55 with sheath outlet(s) or passage(s) 415 formed in the second end 410 or otherwise positioned between the second end 410 and the first end 405. In some embodiments, the body 402 forms a tapered portion 416 with a gradually increasing outer diameter, a middle portion 417 with a consistent outer diameter, and a frusto-conical shaped portion 420 with the passage(s) 415 formed in the frusto-conical shaped portion 420 of the body 402. In some embodiments, the passage(s) 415 have a longitudinal axis that is/are coaxial to, parallel to, or offset from a longitudinal axis of the shunt 10 by about 90 degrees or less. As illustrated in FIG. 14, an annulus 420 is formed between an internal surface 425 of the sheath 400 and an external surface 430 of the shunt 10. The passage(s) 415 are in fluid communication with the annulus 420.

Figure 15:
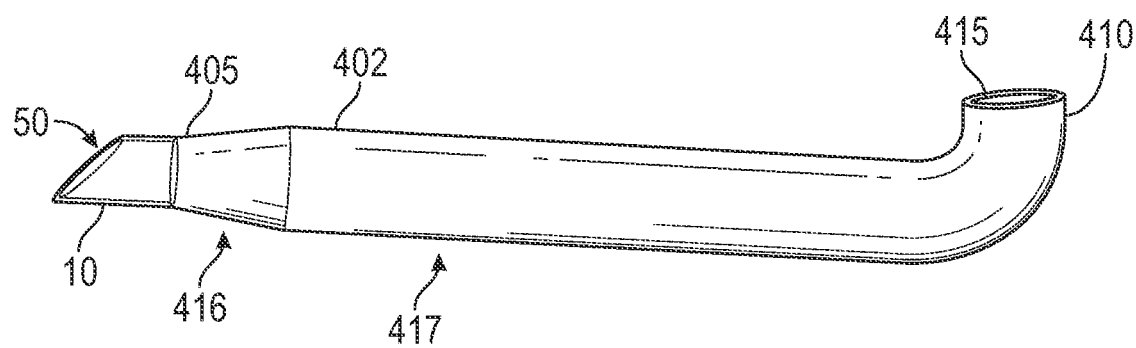
FIG. 15 is a perspective view of another embodiment of the sheathed shunt of FIG. 12, according to an example embodiment.
Figure 16:
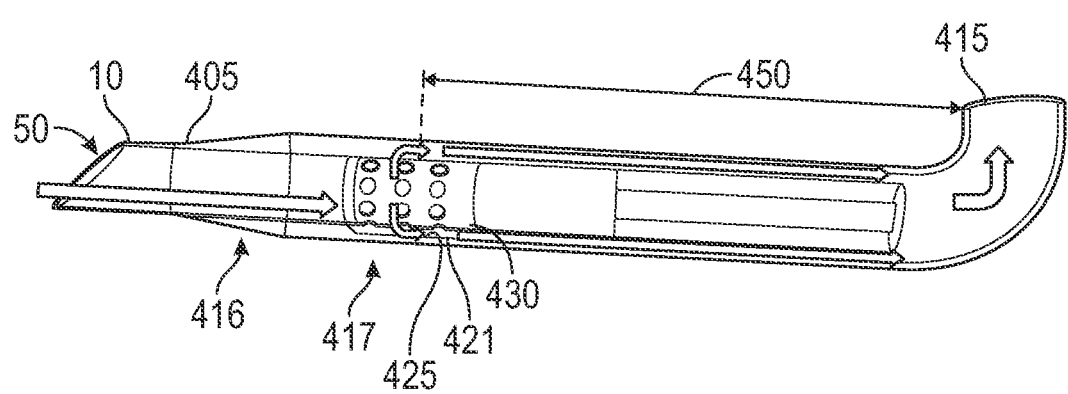
FIG. 16 is a sectional view of the sheathed shunt of FIG. 15, according to an example embodiment.

Another embodiment of the sheath 400 is illustrated in FIGS. 15 and 16. As illustrated in FIGS. 15 and 16, the passage(s) is a singular passage 415 having a longitudinal axis that is perpendicular to the longitudinal axis of the shunt 10. As illustrated in FIGS. 12-16, the passage(s) 415 are spaced from the outlets 55 by a distance 450.

In operation, the fluid exiting the plurality of outlets 55 of the shunt 10 enters the annulus 420 and exits the passage(s) 415. In some embodiments, the sheath 400 allows for variations in the positioning of the outlets 55 relative to the inlet 50 and variations in the length 58. That is, using the sheath 400, the shunt 10—in its entirety—can be placed within the area that is being drained, with the passage(s) 415 extending into an area that receives the drained fluid, such as the Schlemm's canal. However, in some embodiments and using the sheath 400, the plurality of outlets 55 is positioned in the area that is being drained with the sheath 400 fluidically isolating the plurality of outlets 55 from the area to be drained and diverting the biofluid to another area. Generally, the pressure sensor 105 is placed in the sclera 60 or at least in fluid communication with the biofluid that is contained by the sclera 60. In some embodiments, the tubular body 402 is flexible and/or transparent.

In some embodiments, the sheathed shunt, which includes the shunt 10 and the sheath 400 is a two-chamber shunt or valve. That is, the fluid chamber 80 is a first chamber and the annulus 421 is a second chamber. In this example, the biofluid initially enters the fluid chamber 80 and exits the plurality of outlets 55 to reduce the pressure within the eye. When exiting via the plurality of outlets 55, the biofluid enters the annulus 421, which then diverts the biofluid to a location via the passage(s) 415 that are spaced from the plurality of outlets 55.

In some embodiments, the tubular body 35 is formed from two tubulars coupled together. The first tubular includes the valve inlet 50 and the second tubular forms the plurality of outlets 55 and the cap 65. In some embodiments, the first tubular is a flexible tubular that may be curved, bent, or otherwise shaped to extend over and/or within the eye 30. In some embodiments, one or more portions of the shunt valve 10 is made of a hard polymer such as acrylic (i.e., polymethyl methacrylate) or cyclic olefin copolymer. In some embodiments, one or more portions of the shunt valve 10 is formed from a medical grade polymer such as for example Nylon, polypropylene, polyester, polyethylene, ultra-high molecular weight polyethylene, polyethylene terephthalate, silicone rubber, polyurethane, polymethyl methacrylate (Acrylic), polysulphones, hydrogel, polyphosphazenes, thermoplastic elastomers, and polydimethylsiloxane. In some embodiments, one or more portions of the shunt valve 10 formed from hard materials are formed from Polyether ether ketone (PEEK) or polycarbonate (PC). In some embodiments, one or more portions of the shunt valve 10 is formed from silicone rubber and/or a thermoplastic elastomer. In other embodiments, one or more portions of the shunt valve 10 are printed using a 3-dimensional printer such that the shunt valve 10 forms a unitary printed body with elements that are movable within the shunt valve 10 printed and captured within the tubular body 35. In some embodiments, the second tubular is formed of a metal such that the longitudinal axis 40 of the second tubular remains straight during operation, in order to encourage the plunger 70 to move freely within the valve chamber 75.

In some embodiments, the pressure sensor 105 is positioned near the sclera 60 to measure the fluid within the eye 30 directly. In some embodiments, a pressure sensor and a microcontroller configured for wireless communication are positioned remotely from the shunt valve 10 in the eye 30 to detect the pressure within the eye 30 in combination with or in place of the pressure sensor 105 and the microcontroller 120.

In some embodiments, the energized material 90 is placed between the valve inlet 50 and the plunger 70, and the plunger 70 moves to stretch the energized material 90 in response to an unacceptable pressure being applied to the first face 70a of the plunger 70. In that example, the energized material 90 may be a rubber band or spring that is placed in tension when the shunt valve 10 is in the open position.

In some embodiments, a mesh or other permeable barrier is placed across the valve inlet 50 to prevent cells of a certain size from entering the fluid chamber 80 and blocking the plurality of outlets 55. In some embodiments, the material in which the plurality of outlets 55 is formed is treated to minimize cell growth in the outlets.

Generally, the shunt valve 10 prevents backward flow of biofluid into the eye 30, prevents flow from the eye 30 if the pressure is too low, measures the flow of biofluid from the eye 30, measures the pressure of the biofluid in the eye 30, and tracks a condition of the patient 25. As such, the shunt valve 10 is an auto-regulation biofluid system for the eye 30.

In some embodiments, more than one shunt valve 10 is implanted in the eye 30 with each shunt valve 10 sending data to one microcontroller, such as the microcontroller 135 and/or 140, for the data to be aggregated with permission from the patient 25.

In some embodiments, the shunt valve 10 includes a positional sensor and/or an optical sensor that is operably coupled to the microcontroller 120 to monitor for errors or abnormalities. Upon detection of an error or abnormality, the microcontroller 120 and/or the microcontroller 140 alerts the user of the error or abnormality. For example, if the pressure detected is below or at an acceptable level, but the flow sensor 110 detects flow through the shunt valve 10, then the shunt valve 10 may be malfunctioning and an alert is sent to the patient 25 via the alarm device 130 and/or the alarm device 145. Additionally, if the flow sensor 110 detects zero flow but the pressure sensor 105 detects a pressure that is above the acceptable level, then the shunt valve 10 may be malfunctioning and an alert is sent to the patient 25 via the alarm device 130 and/or the alarm device 145.

In some embodiments, the shunt valve 10 is configured such that the plunger 70 provides adjustable resistance to the biofluid. As noted above, the energized material 90 can have a spring constant that results in a non-linear compression of the energized material 90. This results in an adjustable resistance in that the resistance of the plunger 70 to the biofluid increases as plunger 70 moves towards the cap 65. In order to provide adjustable resistance such that the resistance of the plunger 70 to the biofluid decreases or otherwise changes as the plunger 70 moves towards the cap 65, a portion of the internal surface 85 is treated or otherwise formed to provide additional friction against the plunger 70 along a specific portion of the tubular body 35. Generally, in this example the energized material 90 has a spring constant that results in a linear compression of the energized material 90. It is the addition of additional friction forces to the plunger 70 as it moves along portions of the tubular body 35 that creates adjustable resistance to the biofluid. In some embodiments, the internal surface 85 is treated or otherwise formed to provide additional friction against the plunger 70 only when the plunger 70 is moving towards the cap 65 (i.e., the shunt valve 10 is opening) and does not provide additional friction against the plunger 70 when the plunger 70 is moving away from the cap 65 (i.e., the shunt valve 10 is closing). In other embodiments, the inner diameter of the tubular body 35 is decreased in an area to provide additional friction to the plunger 70 as it passes through the area.

As illustrated, the plunger 70 is a solid cylindrical shape forming one sealing surface along its outer diameter. However, the plunger 70 can be barbell shaped to provide two separate sealing surfaces or be any other appropriate shape. As illustrated, the plunger 70 forms a consistent outer diameter and the tubular body 35 forms a consistent inner diameter. However, in some embodiments the tubular body 35 forms two internal shoulders or stops that are spaced along the longitudinal axis 40, and the plunger 70 is trapped, longitudinally, between the two internal shoulders or stops. The stop located closer to the valve inlet 50 limits the movement of the plunger 70 in the direction towards the valve inlet 50 and the stop located closer to the cap 65 limits the movement of the plunger 70 in the direction towards the cap 65.

Generally, any creation, storage, processing, and/or exchange of user data associated with the method, apparatus, and/or system disclosed herein is configured to comply with a variety of privacy settings and security protocols and prevailing data regulations, consistent with treating confidentiality and integrity of user data as an important matter. For example, the apparatus and/or the system may include a module that implements information security controls to comply with a number of standards and/or other agreements. In some embodiments, the module receives a privacy setting selection from the user and implements controls to comply with the selected privacy setting. In other embodiments, the module identifies data that is considered sensitive, encrypts data according to any appropriate and well-known method in the art, replaces sensitive data with codes to pseudonymize the data, and otherwise ensures compliance with selected privacy settings and data security requirements and regulations.

Figure 17:
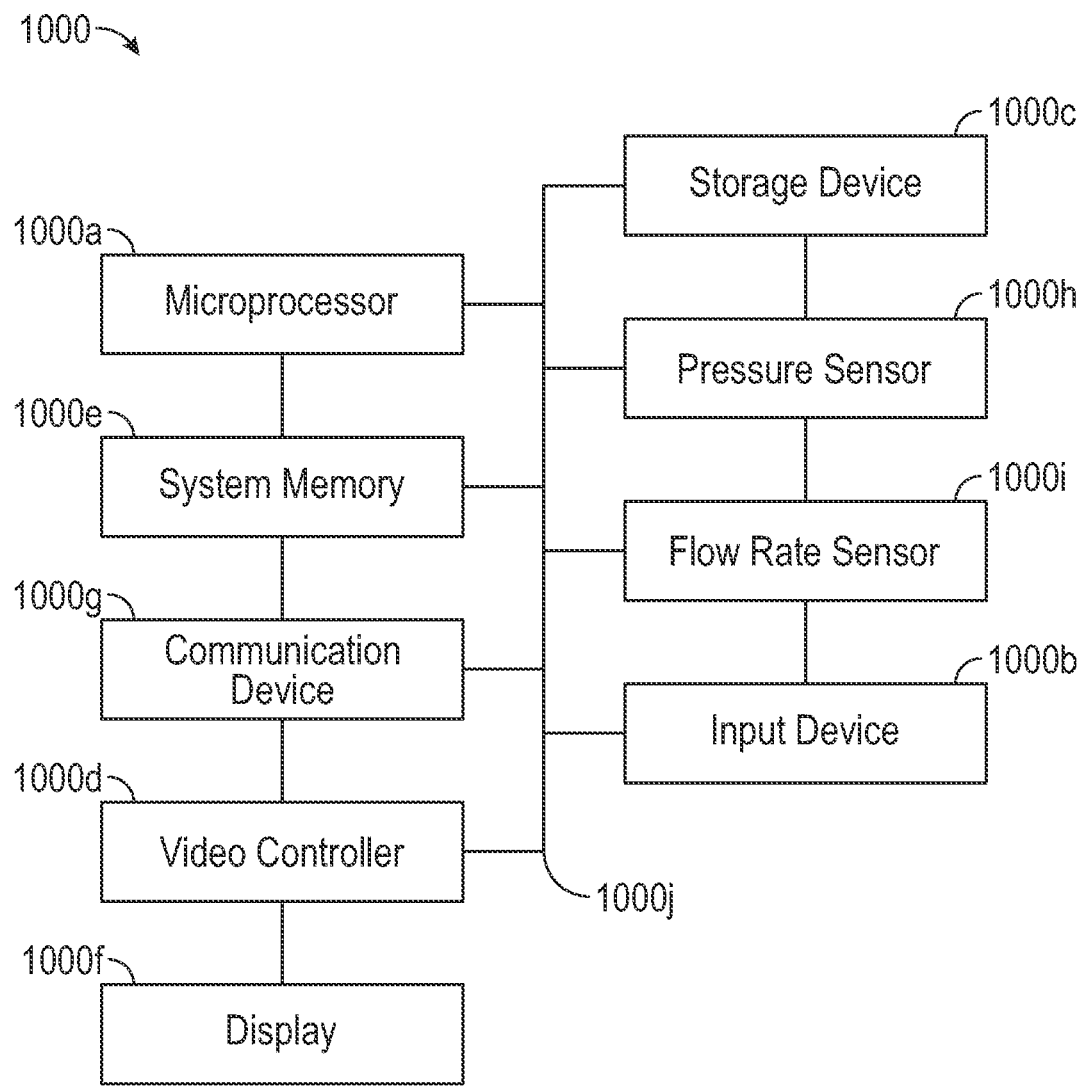
FIG. 17 is a diagrammatic illustration of a node for implementing one or more example embodiments of the present disclosure, according to an example embodiment.

In an example embodiment, as illustrated in FIG. 17 with continuing reference to FIGS. 1-16, an illustrative node 1000 for implementing one or more of the example embodiments described above and/or illustrated in FIGS. 1-16 is depicted. The node 1000 includes a microprocessor 1000a, an input device 1000*b*, a storage device 1000*c*, a video controller 1000*d*, a system memory 1000*e*, a display 1000*f*, and a communication device 1000*g*, a pressure sensor 1000*h*, a flow rate sensor 1000*i*, all interconnected by one or more buses 1000*j*. In several example embodiments, the storage device 1000*c* may include a hard drive, CD-ROM, optical drive, any other form of storage device and/or any combination thereof. In several example embodiments, the storage device 1000*c* may include, and/or be capable of receiving, a CD-ROM, DVD-ROM, or any other form of computer-readable medium that may contain executable instructions. In several example embodiments, the communication device 1000*g* may include a modem, network card, or any other device to enable the node to communicate with other nodes. In several example embodiments, any node represents a plurality of interconnected (whether by intranet or Internet) computer systems, including without limitation, personal computers, mainframes, PDAs, smartphones and cell phones. In some embodiments, the pressure sensor 1000*h* may include the pressure sensor 105. In some embodiments, the flow rate sensor 1000*i* may include the flow rate sensor 110.

In several example embodiments, one or more of the components of the systems described above and/or illustrated in FIGS. 1-16, include at least the node 1000 and/or components thereof, and/or one or more nodes that are substantially similar to the node 1000 and/or components thereof. In several example embodiments, one or more of the above-described components of the node 1000, the shunt valve 10 and/or the remote device 15 include respective pluralities of the same components.

In several example embodiments, one or more of the applications, systems, and application programs described above and/or illustrated in FIGS. 1-12, include a computer program that includes a plurality of instructions, data, and/or any combination thereof; an application written in, for example, Arena, Hypertext Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several example embodiments pulls real-time information from one or more servers, automatically refreshing with latest information at a predetermined time increment; or any combination thereof.

In several example embodiments, a computer system typically includes at least hardware capable of executing machine readable instructions, as well as the software for executing acts (typically machine-readable instructions) that produce a desired result. In several example embodiments, a computer system may include hybrids of hardware and software, as well as computer sub-systems.

In several example embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several example embodiments, hardware may include any physical device that is capable of storing machine-readable instructions, such as memory or other data storage devices. In several example embodiments, other forms of hardware include hardware sub-systems, including transfer devices such as modems, modem cards, ports, and port cards, for example.

In several example embodiments, software includes any machine code stored in any memory medium, such as RAM or ROM, and machine code stored on other devices (such as flash memory, or a CD ROM, for example). In several example embodiments, software may include source or object code. In several example embodiments, software encompasses any set of instructions capable of being executed on a node such as, for example, on a client machine or server.

In several example embodiments, combinations of software and hardware could also be used for providing enhanced functionality and performance for certain embodiments of the present disclosure. In an example embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several example embodiments, computer readable mediums include, for example, passive data storage, such as a random-access memory (RAM) as well as semi-permanent data storage such as a compact disk read only memory (CD-ROM). One or more example embodiments of the present disclosure may be embodied in the RAM of a computer to transform a standard computer into a new specific computing machine. In several example embodiments, data structures are defined organizations of data that may enable an embodiment of the present disclosure. In an example embodiment, a data structure may provide an organization of data, or an organization of executable code.

In several example embodiments, any networks and/or one or more portions thereof may be designed to work on any specific architecture. In an example embodiment, one or more portions of any networks may be executed on a single computer, local area networks, client-server networks, wide area networks, internets, hand-held and other portable and wireless devices and networks.

In several example embodiments, a database may be any standard or proprietary database software. In several example embodiments, the database may have fields, records, data, and other database elements that may be associated through database specific software. In several example embodiments, data may be mapped. In several example embodiments, mapping is the process of associating one data entry with another data entry. In an example embodiment, the data contained in the location of a character file can be mapped to a field in a second table. In several example embodiments, the physical location of the database is not limiting, and the database may be distributed. In an example embodiment, the database may exist remotely from the server, and run on a separate platform. In an example embodiment, the database may be accessible across the Internet. In several example embodiments, more than one database may be implemented.

In several example embodiments, a plurality of instructions stored on a non-transitory computer readable medium may be executed by one or more processors to cause the one or more processors to carry out or implement in whole or in part the above-described operation of each of the above-described example embodiments of the system, the method, and/or any combination thereof. In several example embodiments, such a processor may include one or more of the microprocessor 1000*a*, any processor(s) that are part of the components of the system, and/or any combination thereof, and such a computer readable medium may be distributed among one or more components of the system. In several example embodiments, such a processor may execute the plurality of instructions in connection with a virtual computer system. In several example embodiments, such a plurality of instructions may communicate directly with the one or more processors, and/or may interact with one or more operating systems, middleware, firmware, other applications, and/or any combination thereof, to cause the one or more processors to execute the instructions.

It is understood that variations may be made in the foregoing without departing from the scope of the present disclosure.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes and/or procedures may be merged into one or more steps, processes and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The present disclosure includes a shunt valve for removing biofluid from an eye of a user, the valve including: a tubular body defining a plunger accommodated within the tubular body and fluidically coupled to the inlet; wherein the plunger is movable relative to the plurality of outlets; and an energized material coupled to the plunger and the tubular body; wherein the energized material is compressible to expose a portion of the plurality of outlets dependent on the pressure applied to the energized material. In one embodiment, the energized material is fluidically isolated from the inlet and the plurality of outlets. In one embodiment, the tubular body has a longitudinal axis and the outlets in the plurality of outlets are spaced along the longitudinal axis of the tubular body. In one embodiment, the size of the outlets in the plurality of outlets changes as the distance from the inlet increases. In one embodiment, the outlets in the plurality of outlets are circumferentially spaced. In one embodiment, the number of outlets that are circumferentially spaced changes as the distance from the inlet increases. In one embodiment, the shunt valve includes a pressure sensor operably positioned to detect pressure of an aqueous humour in the eye. In one embodiment, the shunt valve includes a proximity sensor positioned to detect a position of the plunger. In one embodiment, the shunt valve includes a flow sensor positioned between the inlet and the plurality of outlets. In one embodiment, the flow sensor includes a cantilevered arm that is configured to move in response to a flow of fluid out of the plurality of outlets. In one embodiment, the shunt valve includes a sensor configured to monitor a flow rate of an aqueous humour passing through the plurality of outlets and/or an aqueous humour pressure within the eye; and a microcontroller configured to wirelessly communicate the monitored flow rate and/or the monitored aqueous humour pressure within the eye to a remote device. In one embodiment, the shunt valve includes a sheath disposed about the tubular body such that an annulus is formed between the exterior surface of the tubular body and the internal surface of the sheath; wherein the sheath has passage(s) that are spaced from the plurality of outlets.

The present disclosure also includes a method of monitoring a flow of a biofluid from an eye of a user, the method including: providing a shunt valve that is positioned across a sclera of the eye of the user; wherein the shunt valve includes: a tubular defining an inlet and a plurality of outlets formed through a wall of the tubular body; a plunger accommodated within the tubular body and fluidically coupled to the inlet; wherein the plunger is movable relative to the plurality of outlets; and an energized material coupled to the plunger and the tubular body; allowing the energized material to compress in response to the plunger moving a first distance, wherein the plunger moving the first distance places the inlet in fluid communication with a first portion of the plurality of outlets, wherein the number of the first portion of the plurality of outlets depends on the first distance; detecting the movement of the plunger by the first distance; and detecting, based on the movement of the plunger by the first distance, the pressure of the biofluid in the eye of the user. In one embodiment, the method also includes allowing the energized material to further compress in response to the plunger moving a second distance that exceeds the first distance, wherein the plunger moving the second distance places the inlet in fluid communication with a second portion of the plurality of outlets that includes the first portion of the plurality of outlets, wherein the number of the second portion of the plurality of outlets depends on the second distance. In one embodiment, the method also includes wirelessly communicating to a remote device the detected pressure of the biofluid in the eye of the user. In one embodiment, the method also includes generating an alarm visible through the tubular body when the detected pressure of the biofluid in the eye of the user exceeds a predetermined acceptable pressure. In one embodiment, the method also includes detecting movement of a cantilever arm that extends within the tubular body and between the inlet and the plurality of outlets; and determining a flow rate of the biofluid exiting the eye based on the detected movement of the cantilever arm. In one embodiment, the method also includes wirelessly communicating to a remote device the flow rate of the biofluid exiting the eye. In one embodiment, the tubular body has a longitudinal axis and the outlets in the plurality of outlets are spaced along the longitudinal axis of the tubular body; and wherein the size of the outlets in the plurality of outlets changes as the distance from the inlet increases. In one embodiment, the outlets in the plurality of outlets are circumferentially spaced; and wherein the number of outlets that are circumferentially spaced changes as the distance from the inlet increases. In one embodiment, the method also includes diverting biofluid exiting the plurality of outlets through a sheath disposed about the shunt valve.

The present disclosure also includes a medical-grade valve implantable within a patient, the valve including: a body forming a valve inlet on one end and including a cap on an opposing end; wherein a plurality of outlets is formed within a wall of the body; and wherein outlets in the plurality of outlets are circumferentially and longitudinally spaced along a longitudinal axis of the body; a plunger positioned within the body; wherein a valve chamber is formed between the plunger and the cap; wherein a fluid chamber is formed between the plunger and the valve inlet; wherein the plunger is movable along the longitudinal axis of the body to increase the size of the fluid chamber while simultaneously decreasing the size of the valve chamber; an energized material accommodated within the valve chamber; wherein the energized material is positioned between the plunger and the cap; wherein the energized material is fluidically isolated from the valve inlet and the plurality of outlets; and wherein the energized material is energized when the plunger moves, in response to a predetermined force being applied to the plunger, to reduce the size of the valve chamber and simultaneously increase the size of the fluid chamber to place at least a portion of the plurality of outlets in communication with the valve inlet. In one embodiment, the valve is configured to be positioned in an eye of the patient, wherein the valve further includes a pressure sensor positioned to detect a pressure of aqueous humour within the eye of the patient, and wherein the pressure sensor is in wireless communication with a remote device. In one embodiment, the valve also includes a flow rate sensor positioned to detect a flow rate of a fluid through the valve; wherein the flow rate sensor is in communication with a remote device. In one embodiment, the size of the outlets in the plurality of outlets changes as the distance from the inlet increases. In one embodiment, the number of outlets that are circumferentially spaced changes as the distance from the inlet increases. In one embodiment, the valve also includes a sheath disposed about the body such that an annulus is formed between an exterior surface of the body and an internal surface of the sheath; wherein the sheath has passage(s) that are spaced from the plurality of outlets.

It is understood that variations may be made in the foregoing without departing from the scope of the disclosure. Furthermore, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "vertical," "horizontal," "angular," "upwards," "downwards," "side-to-side," "left-to-right," "right-to-left," "top-to-bottom," "bottom-to-top," "top," "bottom," "bottom-up," "top-down," "front-to-back," etc., are for the purpose of illustration only and do not limit the specific orientation or location of the structure described above.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What we claim is:

1. A shunt valve for removing biofluid from an eye of a user, the shunt valve comprising:
   a tubular body defining an inlet and a plurality of outlets formed through a wall of the tubular body;
   a plunger accommodated within the tubular body and fluidically coupled to the inlet,
      wherein the plunger is movable relative to the plurality of outlets; and
   an energized material coupled to the plunger and the tubular body;
      wherein the energized material is compressible to expose a portion of the plurality of outlets dependent on the pressure applied to the energized material;
      wherein the plurality of outlets comprises a plurality of sets of outlets, each of the plurality of sets of outlets spaced apart along the tubular body and configured in a manner that all outlets in each set of the plurality of sets of outlets are spaced apart on an outer circumference of a cross-section, the cross-section being substantially perpendicular to a longitudinal axis of the tubular body; and
      wherein the plurality of outlets is configured in a manner that a rate of change value increases as the plunger exposes a greater number of the plurality of sets of outlets, the rate of change value being equal to a change in output area per unit distance of plunger movement.

2. The shunt valve of claim 1, wherein the energized material is fluidically isolated from the inlet and the plurality of outlets.

3. The shunt valve of claim 1,
   wherein the tubular body has a longitudinal axis and the outlets in the plurality of outlets are spaced along the longitudinal axis of the tubular body; and
   wherein the outlets in the plurality of outlets are circumferentially spaced along the tubular body.

4. The shunt valve of claim 3,
   wherein the size of the outlets in the plurality of outlets changes as the distance from the inlet increases; or
   wherein the number of outlets that are circumferentially spaced changes as the distance from the inlet increases.

5. The shunt valve of claim 1, further comprising a pressure sensor operably positioned to detect pressure of an aqueous humour in the eye.

6. The shunt valve of claim 1, further comprising a flow sensor positioned between the inlet and the plurality of outlets.

7. The shunt valve of claim 6, wherein the flow sensor comprises a cantilevered arm that is configured to move in response to a flow of fluid out of the plurality of outlets.

8. The shunt valve of claim 1, further comprising:
a sensor configured to monitor a flow rate of an aqueous humour passing through the plurality of outlets and/or an aqueous humour pressure within the eye; and
a microcontroller configured to wirelessly communicate the monitored flow rate and/or the monitored aqueous humour pressure within the eye to a remote device.

9. The shunt valve of claim 1, further comprising a sheath disposed about the tubular body such that an annulus is formed between an exterior surface of the tubular body and an internal surface of the sheath;
wherein the sheath has passage(s) that are spaced from the plurality of outlets.

10. A method of monitoring a flow of a biofluid from an eye of a user, the method comprising:
providing a shunt valve that is positioned across a sclera of the eye of the user; wherein the shunt valve comprises:
a tubular body defining an inlet and a plurality of outlets formed through a wall of the tubular body;
a plunger accommodated within the tubular body and fluidically coupled to the inlet;
wherein the plunger is movable relative to the plurality of outlets; and
an energized material coupled to the plunger and the tubular body;
allowing the energized material to compress in response to the plunger moving a first distance, wherein the plunger moving the first distance places the inlet in fluid communication with a first portion of the plurality of outlets, wherein the number of the first portion of the plurality of outlets depends on the first distance;
wherein the plurality of outlets comprises a plurality of sets of outlets, each of the plurality of sets of outlets spaced apart along the tubular body and configured in a manner that all outlets in each set of the plurality of sets of outlets are spaced apart on an outer circumference of a cross-section, the cross-section being substantially perpendicular to a longitudinal axis of the tubular body; and
wherein the plurality of outlets is configured in a manner that a rate of change value increases as the plunger exposes a greater number of the plurality of sets of outlets, the rate of change value being equal to a change in output area per unit distance of plunger movement;
detecting the movement of the plunger by the first distance; and
detecting, based on the movement of the plunger by the first distance, the pressure of the biofluid in the eye of the user.

11. The method of claim 10, further comprising allowing the energized material to further compress in response to the plunger moving a second distance that exceeds the first distance, wherein the plunger moving the second distance places the inlet in fluid communication with a second portion of the plurality of outlets that includes the first portion of the plurality of outlets, wherein the number of the second portion of the plurality of outlets depends on the second distance.

12. The method of claim 10, further comprising generating an alarm visible through the tubular body when the detected pressure of the biofluid in the eye of the user exceeds a predetermined acceptable pressure.

13. The method of claim 10, further comprising:
detecting movement of a cantilever arm that extends within the tubular body and between the inlet and the plurality of outlets; and
determining a flow rate of the biofluid exiting the eye based on the detected movement of the cantilever arm.

14. The method of claim 13, further comprising:
wirelessly communicating to a remote device the flow rate of the biofluid exiting the eye; and
wirelessly communicating to a remote device the detected pressure of the biofluid in the eye of the user.

15. The method of claim 10,
wherein the tubular body has a longitudinal axis and the outlets in the plurality of outlets are spaced along the longitudinal axis of the tubular body; and
wherein the size of the outlets in the plurality of outlets changes as the distance from the inlet increases.

16. The method of claim 10, further comprising diverting biofluid exiting the plurality of outlets through a sheath disposed about the shunt valve.

17. A medical-grade valve implantable within a patient, the medical-grade valve comprising:
a body forming a valve inlet on one end and comprising a cap on an opposing end;
wherein a plurality of outlets is formed within a wall of the body; and
wherein outlets in the plurality of outlets are circumferentially and longitudinally spaced along a longitudinal axis of the body;
a plunger positioned within the body;
wherein a valve chamber is formed between the plunger and the cap;
wherein a fluid chamber is formed between the plunger and the valve inlet;
wherein the plunger is movable along the longitudinal axis of the body to increase the size of the fluid chamber while simultaneously decreasing the size of the valve chamber;
an energized material accommodated within the valve chamber;
wherein the energized material is positioned between the plunger and the cap;
wherein the energized material is fluidically isolated from the valve inlet and the plurality of outlets;
wherein the energized material is energized when the plunger moves, in response to a predetermined force being applied to the plunger, to reduce the size of the valve chamber and simultaneously increase the size of the fluid chamber to place at least a portion of the plurality of outlets in communication with the valve inlet;
wherein the size of the outlets in the plurality of outlets changes as the distance of each of the outlets in the plurality of outlets from the inlet increases; and
wherein the number of the outlets in the plurality of outlets that are spaced apart on an outer circumference of a cross-section changes as the distance of each of the outlets in the plurality of outlets from the inlet increases, the cross-section being substantially perpendicular to the longitudinal axis of the body.

18. The medical-grade valve of claim 17,
wherein the medical-grade valve is configured to be positioned in an eye of the patient,
wherein the medical-grade valve further comprises a pressure sensor positioned to detect a pressure of aqueous humour within the eye of the patient, and wherein the pressure sensor is in wireless communication with a remote device.

19. The medical-grade valve of claim 17, further comprising a flow rate sensor positioned to detect a flow rate of a fluid through the medical-grade valve;
wherein the flow rate sensor is in communication with a remote device.

20. The medical-grade valve of claim 17, further comprising a sheath disposed about the body such that an annulus is formed between an exterior surface of the body and an internal surface of the sheath;
wherein the sheath has passage(s) that are spaced from the plurality of outlets.

\* \* \* \* \*